Dec. 12, 1933.   C. A. CAMPBELL   1,938,738
BRAKE PIPE VENT VALVE
Filed Sept. 18, 1931   4 Sheets-Sheet 1

Inventor
Charles A. Campbell
By
Attorneys

Dec. 12, 1933.  C. A. CAMPBELL  1,938,738
BRAKE PIPE VENT VALVE
Filed Sept. 18, 1931  4 Sheets-Sheet 2

Inventor
Charles A. Campbell
By Dodge and Sons
Attorneys

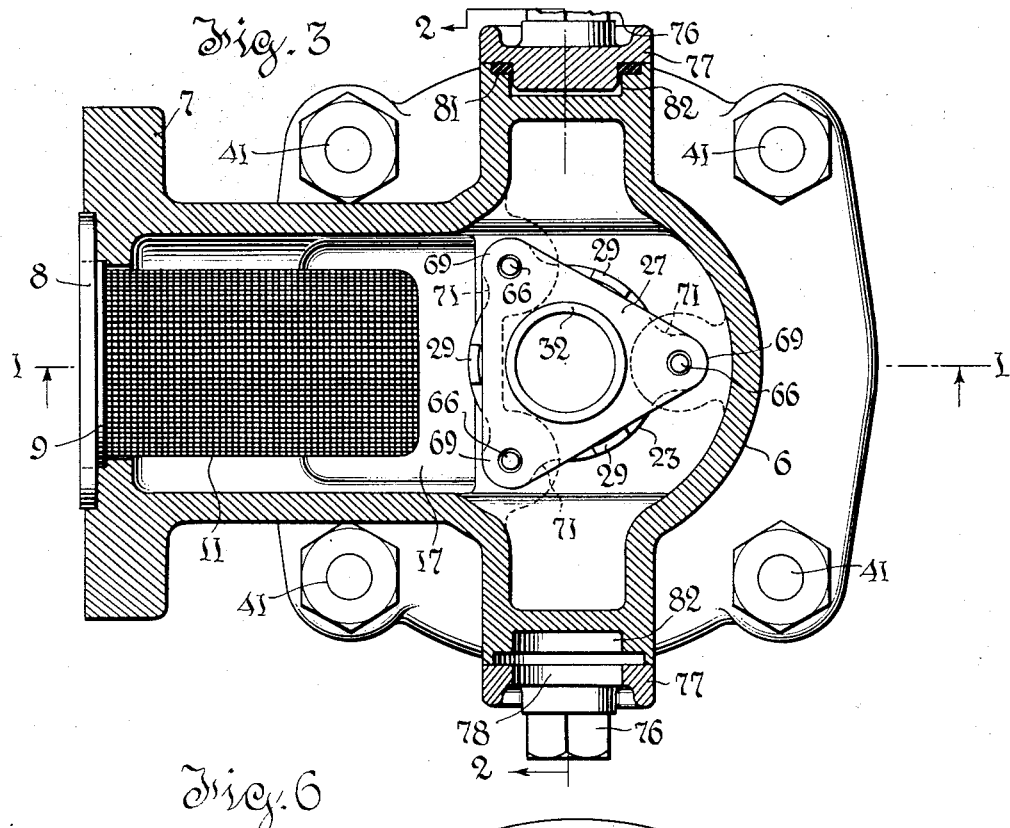
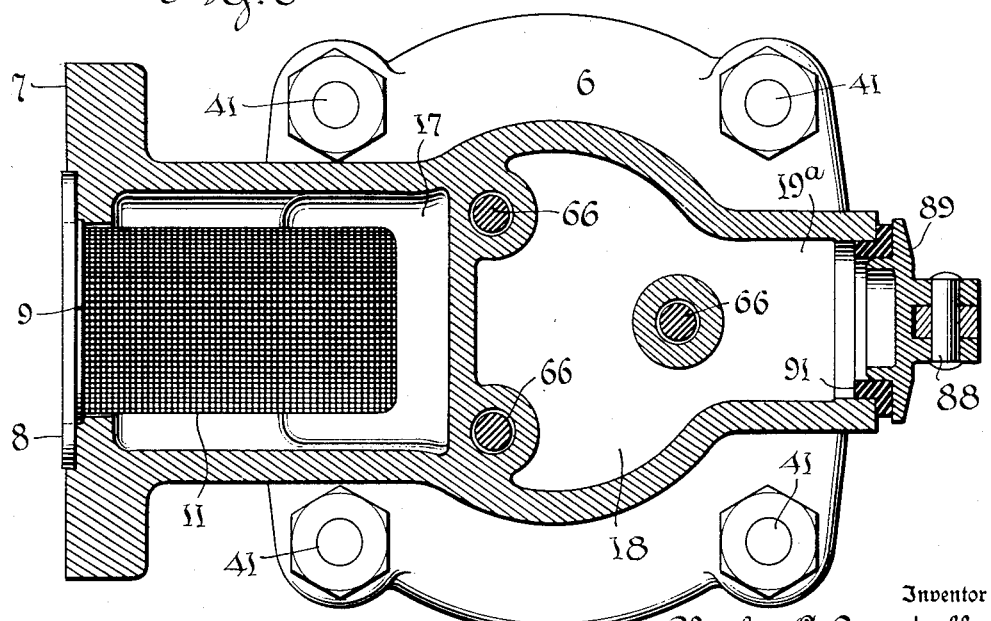

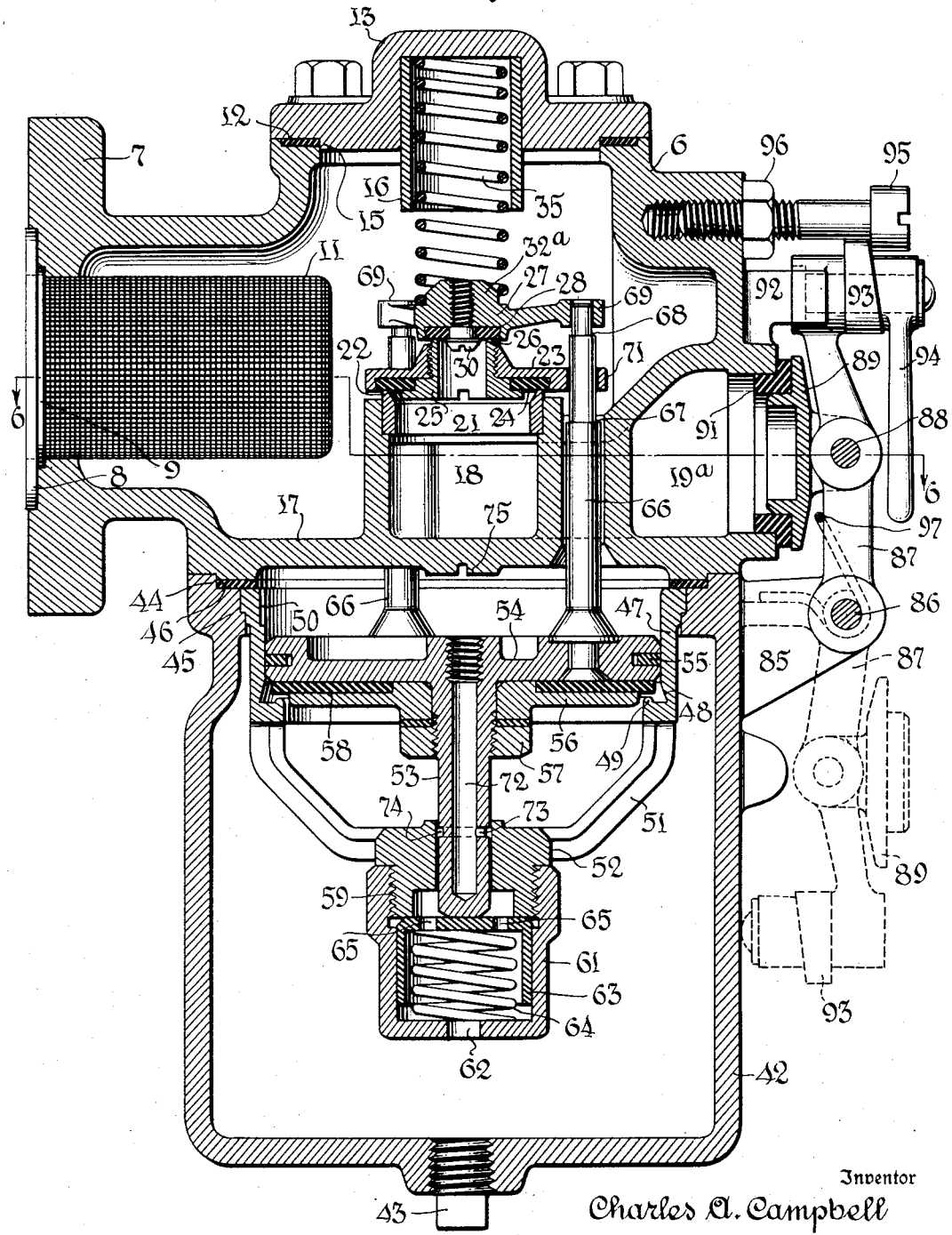

Patented Dec. 12, 1933

1,938,738

UNITED STATES PATENT OFFICE 1,938,738

BRAKE PIPE VENT VALVE

Charles A. Campbell, Watertown, N. Y., assignor to The New York Air Brake Company, a corporation of New Jersey Application September 18, 1931
Serial No. 563,619

22 Claims. (Cl. 303—82)

This invention relates to air brakes and particularly to devices for venting brake pipes of automatic air brake systems to the atmosphere upon rapid reduction of brake pipe pressure irrespective of the response of triple valves. The present application is a continuation in part of applicant's prior application Serial No. 470,755, filed July 25, 1930. Vent valves heretofore developed have been of limited capacity and under some circumstances have been uncertain in operation and the objects of the invention are to secure certain operation and large venting capacity without entailing the use of a large reservoir or an unduly large actuating piston.

Another feature of the invention is an arrangement of the device to protect the actuating piston from water which tends to accumulate in brake systems under certain atmospheric conditions.

Another feature of the invention is the provision of means for sealing the vent port so that the vent valve may be rendered ineffective without disconnecting it from the brake pipe.

Generally stated, the device belongs to a known type in which the piston is balanced between brake pipe pressure and the pressure in a small reservoir charged from the brake pipe under the control of the piston. The parts are so arranged that the tendency to overcharge the reservoir is minimized; the tendency of the piston to freeze or stick at low atmospheric temperatures is minimized; and the capacity of the vent valve is greatly augmented as compared to the best previously known practice.

The valve involves the combination of a number of features which coact to secure the desired results.

The preferred embodiment of the invention which has developed peculiarly advantageous characteristics in test is illustrated in the accompanying drawings, in which Fig. 1 is a vertical axial section of the complete device. The plane of section is indicated by the line 1—1 on Fig. 3.

Fig. 3 is a section on the line 3—3 of Fig. 1.

Fig. 4 is a view, similar to Fig. 1, showing certain modifications.

Fig. 6 is a section on the line 6—6 of Fig. 4.

Figure 1:
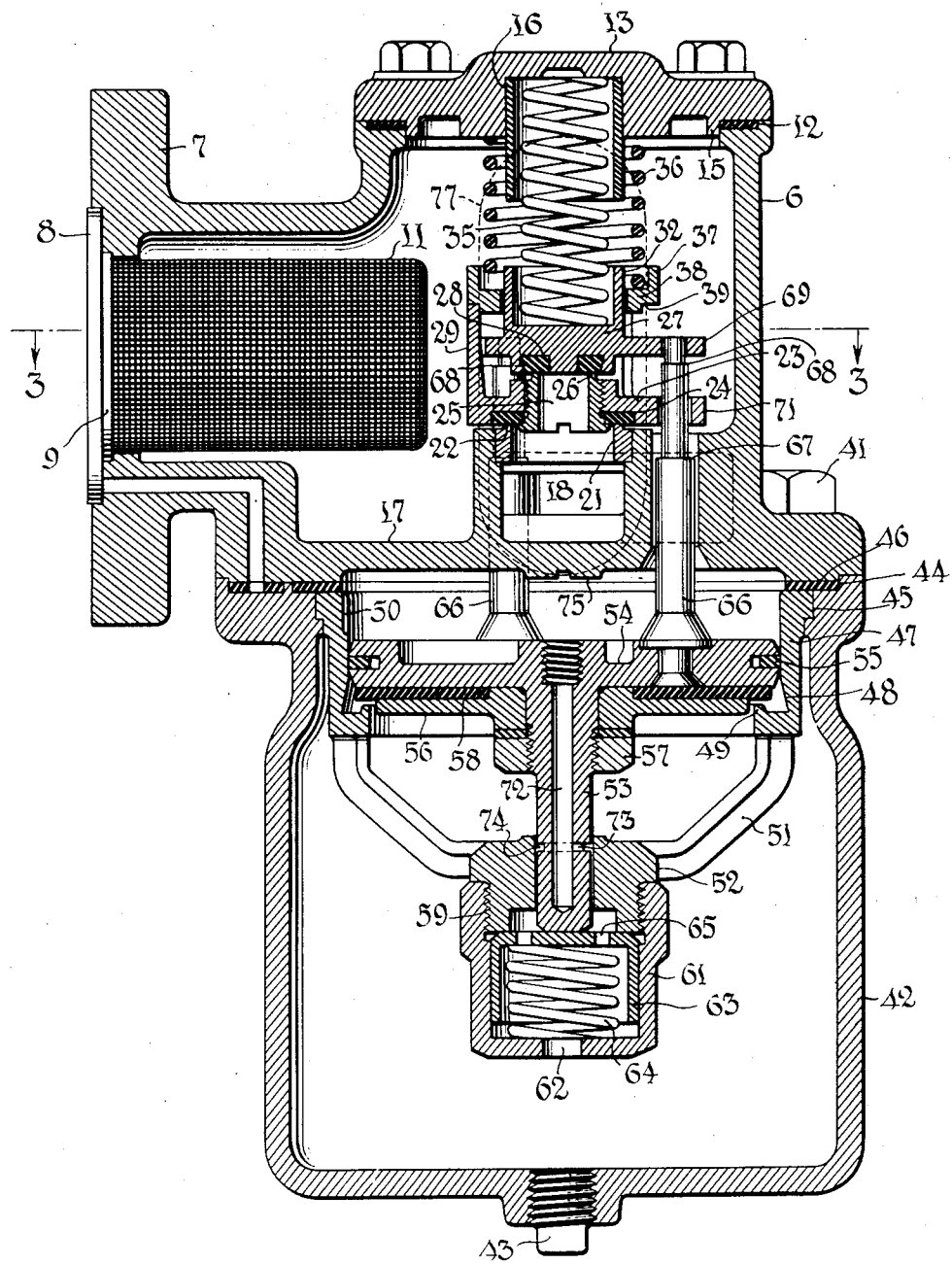
Figure 2:
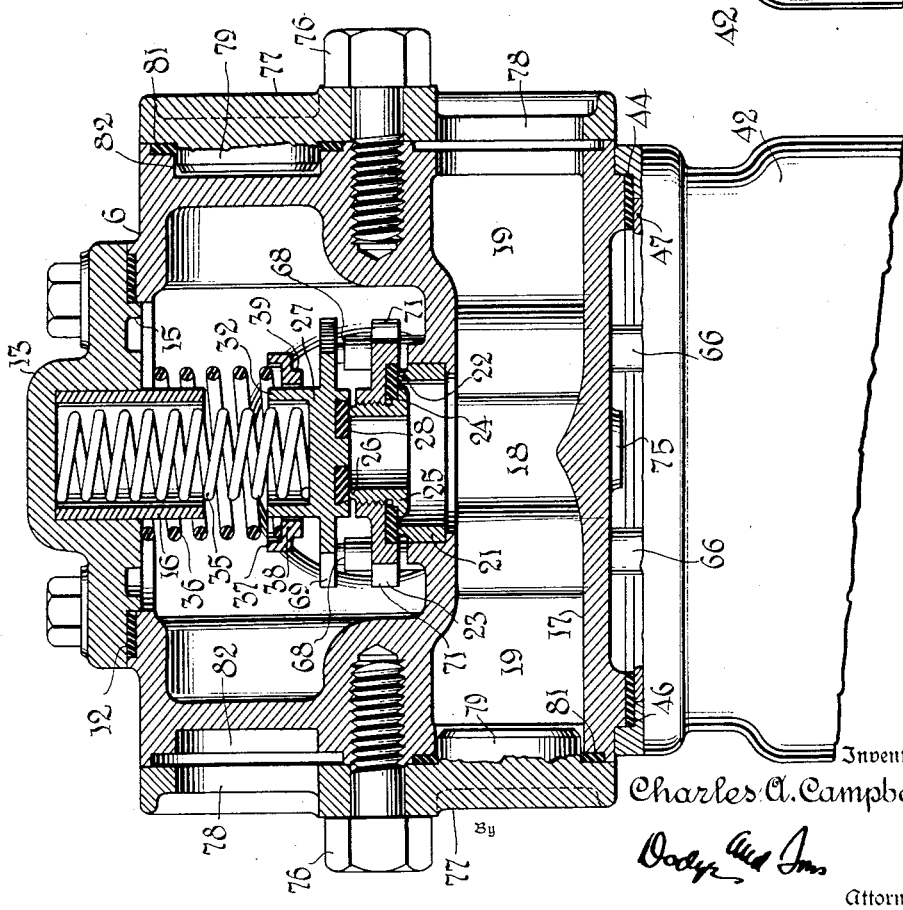
Fig. 2 is a partial section on a somewhat enlarged scale, the plane of section being indicated by the line 2—2 on Fig. 3.

Refer first to Figs. 1, 2 and 3:

The main body or shell of the device is indicated at 6, and is provided with a flange 7 by means of which it is bolted to any suitable ported bolting flange or pad (not shown) having a port communicating directly with the brake pipe. The face of the flange 7 is counterbored to receive a gasket 8, which gasket in its uncompressed condition projects beyond the face of the bolting flange. When the flange is bolted in metal to metal contact with the bolting face which receives it, the gasket 8 is sufficiently compressed to insure an air-tight seal under the pressures encountered in service. The face of the flange is further counterbored concentrically with the counterbore which receives the gasket 8 for the purpose of receiving a metal ring 9 which is removable and which is fixed to and forms a part of a metal gauze strainer thimble 11. The thimble 11 projects into the body 6, as clearly shown in Figs. 1 and 3.

The top of the body 6 is open. It is counterbored to receive a gasket 12 which is compressed to produce an air-tight seal by a cover 13. The cover 13 is held in place by four machine screws and is formed with a centering flange 15 which also assists in confining the gasket 12. The interior of the cover 13 is counterbored at its center. Pressed into this counterbore is a tubular guide member 16 which serves to center the valve-closing springs hereinafter described.

The lower side of the body 6 is closed by a horizontal wall or partition 17 and projecting upward from this is a boss which surrounds a port or chamber 18. Leading from the chamber 18 are two oppositely extending exhaust passages 19 which discharge to atmosphere.

The chamber 18 is open at its top to the interior of the body 6 and is counterbored to receive a bushing 21 which is pressed to place and which has at its upper margin a rounded bead 22 which serves as a seat for the main vent valve 23. This vent valve has on its lower face a gasket 24 of rubber or like material which is clamped in place by a tubular nut 25. The tubular nut has a flange (see Fig. 1), which overlies the inner margin of the gasket 24, and the nut 25 extends through an opening in the center of the valve member 23 and is formed at its upper end with a rounded bead 26 which projects above the upper surface of valve 23 and serves as a seat for the secondary or pilot valve 27. The valve 27 has a rubber or like gasket 28 confined in an undercut recess in its lower face and positioned to seal against the bead 26.

The main valve 23 is formed with a number of upstanding wings or lugs 29, three being shown in the drawings. These straddle the pilot valve member 27. The pilot valve member 27 has an upstanding annular flange 32 which receives and confines the lower end of the auxiliary valve spring 35 whose upper end is similarly confined within the tube 16 already described.

Surrounding the tube 16 is a second and heavier spring 36 which seats against the cover 13 at its upper end and at its lower end seats within a flange 37 on the upper face of a spring seat 38. The lower face of the spring seat is shouldered as indicated at 39 to engage and center itself upon the upper end of the lugs or wings 29 already described. Thus the spring 35 serves to hold the valve 27 closed against the seat 26 and the spring 36 serves to hold the valve 23 closed against the seat or bead 22.

Figure 5:
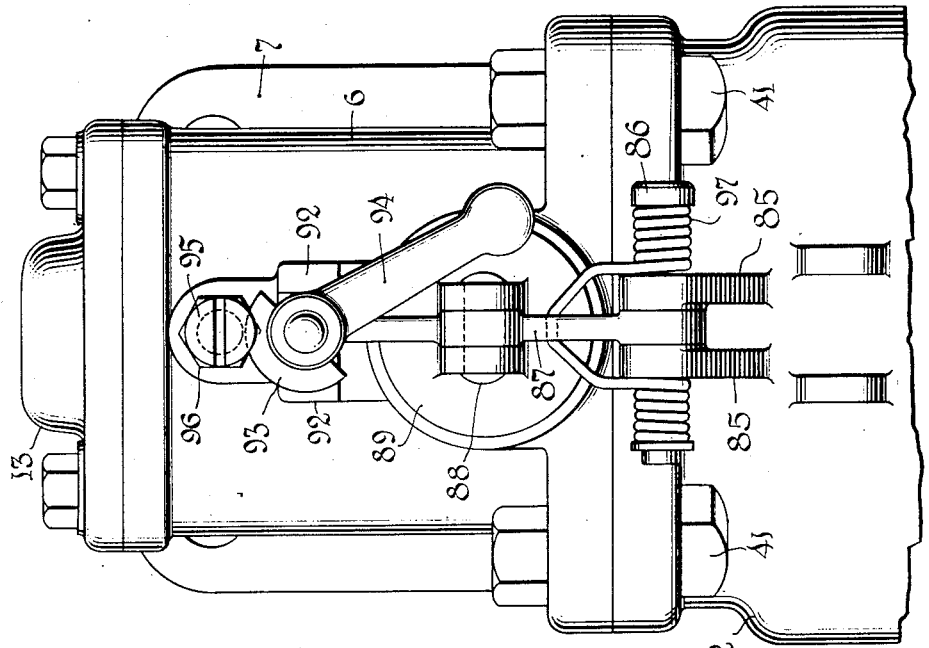
Fig. 5 is a fragmentary elevation, looking to the left relatively to Fig. 4.

In some cases it is preferred to omit the spring 36, and when this is omitted the spring seat 38 is likewise omitted. In such case the upstanding lugs 29 may be omitted, if desired, though their presence does no harm. It will be observed that when both valves are closed the spring 35 functions to hold them closed and the actuating mechanism which unseats the valves is so designed as to open the valve 27 first. Such an arrangement is shown in Figs. 4, 5, and 6.

It will be observed that both valve seats are above the partition 17 so that any water which may pass through the strainer 11 will accumulate in the lower portion of the body 6 immediately above the wall 17 and below the valve seats. This virtually eliminates the possibility of the valves freezing to their seats and keeps water and dust off piston 54.

Connected to the lower face of the partition 17 by means of bolts 41 (four bolts being shown) is the reservoir shell or body 42. This is provided with a drain plug 43 at its lower portion. The counterbore 44 serves two purposes; it centers the body 42 on the body 6, and it centers and offers a sealing face for the gasket 46. The counterbore 45 centers and offers a supporting shoulder for an annular cylinder bushing 47 which is thus positively positioned by metal to metal contact. The upper portion of the interior face of this bushing is cylindrical; the lower portion is flared outwardly as indicated at 48. At its upper margin the bushing 47 is provided with a groove 50 which serves as a by-pass around the edge of the piston 54 when the piston is at its uppermost limit of travel. The groove 50 permits rapid flow of air from the chamber 42 to the space above the piston 54, and thence to atmosphere when both valves 23 and 27 are in their open positions. This insures that the valves 23 and 27 will close more promptly than would be the case if the chamber 42 were vented exclusively through the ports 73 and 72. At its lower margin the bushing 47 has an inwardly projecting flange which terminates in an upwardly presented sealing bead 49. Pendent from the lower margin of the bushing 47 is a yoke structure 51 which carries a hub 52. The hub 52 is formed with a guideway for a stem 53 which projects downward from the piston 54.

The piston 54 moves in the bushing 47 and makes a substantially air-tight sliding fit therewith by means of a piston ring or snap ring 55. Clamped against its lower face by a retainer 56 held by nut 57 which is threaded on the stem 53 is a gasket 58. In the lowermost position of the piston 54 the gasket 58 seats upon and seals against bead 49.

The lower end of the hub 52 is threaded as indicated at 59 to receive a cup nut 61. This cup nut is ported as indicated at 62 and serves as a guide for a cup-shaped piston stop 63 urged upward against the lower face of the hub 52 by a coil compression spring 64. The piston stop 63 is ported as indicated at 65.

When brake pipe pressure only slightly exceeds pressure in the chamber 42 (that is, when the differential pressure is, say about two pounds per square inch), the spring 64 forces the piston stem 53 upward until the piston stop 63 seats against the lower end of the hub 52 (see Fig. 1). At such time the gasket 58 is held clear of the bead 49. When brake pipe pressure predominates by, say more than two pounds, the spring 64 is overpowered, and the gasket 58 seats against the bead 49.

It follows that under normal conditions the gasket 58 is held free of the bead 49, thus minimizing the tendency of these two parts to freeze together.

Rigidly mounted on the piston 54 and projecting from the upper face thereof are a number of thrust pins, three being shown (see Fig. 3). These pins are designated by the reference numeral 66, and project through openings in the body 6, the openings being substantially larger than the pins to permit the free passage of air from the space within the body 6 to the space within the bushing 47 above the piston 54. The pins 66 are also shouldered or reduced at two points as indicated at 67 and 68. Above the shoulder 68 the pins 66 pass through lugs or ears 69 formed integrally with the pilot valve 27. Above the shoulder 67 the pins 66 pass through holes in lugs or ears 71 on the main vent valve 23. The shoulders 67 and 68 are so spaced relatively to the spacing of the ears 71 and 69 when both the valves are closed or seated that after a slight upward motion of the piston 54 from the position shown in Fig. 1, the pilot valve 27 is engaged, and upon slight further upward motion unseated. Further upward motion of the piston 54 will cause the shoulder 67 to engage the ears 71 and unseat the main vent valve 23.

The stem 53 of the piston 54 is formed with a port 72 which leads from the space above the piston to a radial port 73. This radial port terminates in an annular groove 74 formed on the outside of the stem 53. The stem 53 makes a relatively free fit in the hub 52, (the clearance being exaggerated in the drawings to make it visible) and the position of the groove 74 on the stem 53 is so chosen that when the piston is in its normal position of Fig. 1, the groove 74 is wholly below the upper margin of the hub 52 so that feeding flow from the space above the piston 54 is throttled to the capacity of the interval between the stem 53 and the bore of the hub 52. This interval is so chosen as to give the desired charging rate. A slotted boss 75 ensures that port 72 will not be blanked when piston 54 is in its uppermost position during emergency.

When, during the service reduction of brake pipe pressure, the piston 54 rises until the shoulder 68 on the pin 66 engages the wings 69 on the pilot valve 27, the groove 74 will be carried wholly above the upper margin of the hub 52. At such time the radial port 73 permits back flow from the chamber 42 to the brake pipe at such rate that the pressure in chamber 42 will decrease at a service rate. If the rate of reduction of brake pipe pressure is greater than the service rate, back flow through the radial port 73 cannot increase commensurately, and accordingly, brake pipe pressure will fall faster than the pressure in the chamber 42. Consequently, the pressure in chamber 42 acting on the lower side of the piston 54 will force the piston upward against the resistance of spring 35. The effect is to unseat the pilot valve 27 and allow air to discharge from the space within the chamber 6 through chamber 18 and vent ports 19 to atmosphere. The rapid drop of pressure within the chamber 6 reduces the pressure acting on the upper side of the main vent valve 23 and on the upper side of piston 54. Thus the main vent valve 23 will open freely, and the effective pressure urging piston 54 upward will be increased, ensuring rapid complete opening of the vent.

An important feature of the structure above described is that the vent valve is in direct communication and close association with the brake pipe. This ensures extremely rapid action. At times it is desirable to "cut out" the vent valve, because of faulty action or for other reasons. While this could be accomplished by inserting a conventional cutout cock between the vent valve and the brake pipe, the effect would be to retard venting flow, by impairing the close association of the vent valve with the brake pipe. This disadvantage has been avoided and simplified construction has been secured by applying closures directly to the vent ports 19.

One such closure structure is illustrated in Figs. 2 and 3.

Machine screws 76 are threaded into body 6 and swiveled on each of these is a corresponding oblong member 77 having at one end an aperture 78, and at the other end a boss 79 surrounded by a gasket 81. The apertures 78 and bosses 79 are so located relatively to ports 19 that in reverse positions of members 77, they register with the ends of ports 19. In one position (see left side of Fig. 2) boss 79 enters the end of port 19 and gasket 81, compressed by setting up screw 76, forms a seal with the end of port 19. In the reverse position (see right side of Fig. 2) aperture 78 registers with port 19 and boss 79 serves as a positioning lug by entering a recess 82 in body 6. In this position, also, screw 76 is set up. The recess 82 is so formed that gasket 81 is not then compressed.

While Fig. 2 shows one member 77 in one position and the other member 77 in the reverse position, this arrangement is illustrated primarily to facilitate description. The valve is operative as shown in Fig. 2, but ordinarily both ports 19 will be open, giving maximum venting capacity. To render the valve inactive to vent the brake pipe both ports 19 must be closed.

This structure is simple to manufacture and because a wrench must be used there is little likelihood of faulty setting or tampering.

The general sequence of operations can now be briefly traced. During a service reduction of brake pipe pressure, the piston 54 moves upward and the chamber 42 is vented at a service rate so that the pressure in the chamber 42 keeps pace with the brake pipe pressure. As the piston 54 is moved with relative frequency in service oprations, it is protected against danger of freezing in the relatively long intervals between emergency actuations. If the brake pipe reduction is rapid, the upward motion of the piston 54 will be rapid and first the valve 27, and then the valve 23 will be unseated. Inasmuch as the poppet valves are unbalanced the closing tendency exerted by pressure in the chamber 6 is considerable and is proportional to the size of the valve. By using a pilot valve 27 which is as large as can be actuated with certainty by the piston 54 in conjunction with a much larger main vent valve, it is possible to secure a larger venting area than could be secured with a single valve. During release the brake pipe pressure is increased and will rise to a value materially higher than the then existing pressure in the chamber 42. Consequently the piston 54 will move downward and the gasket 58 will seat on the bead 49, precluding any leakage around the periphery of the piston. This limits the recharge rate of the capacity of the clearance between the stem 53 and the hub 52 and minimizes any tendency to overcharge the chamber 42. When the chamber 42 is charged nearly to brake pipe pressure (we have assumed a differential of two pounds per square inch) the spring 64 will shift the piston 54 upward to the position of Fig. 1.

It will be observed that if at the commencement of a service brake pipe reduction, the piston failed to move upward and engage valve 27, groove 74 would remain within hub 52, so that pressure would fall abnormally slowly in chamber 42, thus increasing the normal pressure differential somewhat to ensure motion of the piston. Such motion occurs with every service reduction and has the effect of keeping the piston free. This fact and the possibility of operating a large capacity vent valve by a small chamber and piston produce excellent operating characteristics.

The use of gaskets set in a recess, as described, is an important feature of the present invention. For example, the gasket 46 seals the joint between the body member 6 and the reservoir member 42, and also seals the joint between these members and the bushing 47. At the same time all three members are positively positioned relatively to each other by metal-to-metal contact. The guide for the stem 53 is likewise positively positioned because it is integral with the bushing 47. As a result of this construction the timing of the port 74 with reference to the guide member 52, and the timing of the shoulders on the rod 66 with reference to the two poppet valves, may be quite precisely determined, and can never be affected by variation of sealing pressure on the gaskets. A similar gasket construction with reference to the cap 13 ensures that the tension on the valve springs will be uniform.

The provision for protecting the valve seats and piston from water is of the greatest practical utility.

Refer now to Figs. 4, 5 and 6, which show modifications of structure. The parts numbered 6 to 18, 21 to 28, 35, and 41 to 75 are essentially identical with the similarly numbered parts in Figs. 1 to 3 and require no further description.

Instead of two ports 19 leading from chamber 18, there is a single vent port 19ª. The gasket 28 is held by a screw 30. A boss 32ª centers spring 35 on valve 27, instead of flange 32. The parts 29, 36, 37, 38 and 39 are omitted, so that only one spring, 35, acts to seat the valves 23 and 27. This last permits the valves to open more freely, since after valve 27 opens there is only slight resistance to the opening of valve 23. The structure of Figs. 1 to 3 might be so modified.

A modified construction of the closure of port 19ᵃ is shown in lieu of the parts numbered 76 to 82 in Figs. 1–3. Lugs 85 in chamber 42 carry a pivot pin 86 on which swings an arm 87. Pivoted at 88 to arm 87 is a valve 89 which seals against gasket 91 mounted in the end of vent port 19ᵃ. The end of arm 87 enters between lugs 92 on body 6, and carries swiveled on it a beveled latch cam 93 which may be turned by handle 94. The latch cam 93 when turned engages beneath the head of machine screw 95 which is threaded in body 6 and may be locked in adjusted positions by means of lock nut 96. When cam 93 is disengaged from the head of screw 95 a coil spring 97 wrapped around pivot pin 86 swings lever 87 to the dotted line position of Fig. 4 in which valve 89 is clear of port 19ᵃ.

The various modifications above described may be adopted independently of each other. The purpose in illustrating them is to indicate that the device is susceptible of changes of detail, and that the invention is not strictly limited to a single embodiment.

What is claimed is:—

1. A vent valve comprising in combination a brake pipe chamber; a balancing chamber; a movable abutment interposed between said chambers; throttling means controlling the charging of the balancing chamber from the brake pipe chamber when brake pipe pressure predominates, and the bleeding of the balancing chamber when balancing chamber pressure predominates; a plurality of valves, each controlling independently of the other venting flow from the brake pipe chamber; and lost motion connections between said abutment and said valves for opening said valves successively.

2. A vent valve comprising in combination a brake pipe chamber; a balancing chamber; a movable abutment interposed between said chambers; throttling means controlling the charging of the balancing chamber from the brake pipe chamber when brake pipe pressure predominates, and the bleeding of the balancing chamber when balancing chamber pressure predominates; a plurality of valves, each controlling independently of the other venting flow from the brake pipe chamber; and lost motion connections between said abutment and said valves for permitting the abutment limited motion independently of the valves and then opening said valves successively by the motion of the abutment.

3. A vent valve comprising in combination a brake pipe chamber; a balancing chamber; a movable abutment interposed between said chambers; throttling means controlling the charging of the balancing chamber from the brake pipe chamber when brake pipe pressure predominates, and the bleeding of the balancing chamber when balancing chamber pressure predominates; a plurality of valves, each controlling independently of the other venting flow from the brake pipe chamber; means urging said valves in a closing direction; and lost motion connections between said abutment and said valves for opening said valves successively as the abutment moves when balancing chamber pressure predominates.

4. A vent valve comprising in combination a chamber adapted for connection with a brake pipe; a balancing chamber; a movable abutment interposed between said chambers; throttling means controlling the charging of the balancing chamber from the brake pipe chamber and the bleeding of the balancing chamber at a limited rate; a pair of poppet valves, one a pilot valve controlling a port through the other, and the two valves conjointly controlling venting flow from the brake pipe chamber; and connections between the abutment and said valves for unseating first the pilot and then the other valve serially by motion of the abutment.

5. A vent valve comprising in combination a chamber adapted for connection with a brake pipe; a balancing chamber; a movable abutment interposed between said chambers; throttling means controlling the charging of the balancing chamber from the brake pipe chamber and the bleeding of the balancing chamber at a limited rate; a pair of poppet valves, one a pilot valve controlling a port through the other, and the two valves conjointly controlling venting flow from the brake pipe chamber; springs, one urging each of said valves in a closing direction; and connections between the abutment and said valves for unseating first the pilot and then the other valve serially by motion of the abutment.

6. A vent valve comprising in combination a chamber adapted for connection with a brake pipe; a balancing chamber; a movable piston interposed between said chambers; throttling means actuated by motion of the piston and controlling charging of the balancing chamber from the brake pipe chamber when brake pipe pressure predominates, and the bleeding of the balancing chamber at a limited rate when balancing chamber pressure predominates; sealing means adapted to be engaged by said piston at its limit of motion toward the balancing chamber; a yielding stop for resisting motion of the piston into engagement with said sealing means; a plurality of poppet valves, each controlling venting flow from the brake pipe chamber; and means establishing serial thrust engagement between the piston and said valves to unseat the valves successively as the piston moves under predominant balancing chamber pressure.

7. A vent valve comprising in combination a chamber adapted for connection with a brake pipe; a balancing chamber; a movable piston interposed between said chambers; throttling means actuated by motion of the piston and controlling charging of the balancing chamber from the brake pipe chamber when brake pipe pressure predominates, and the bleeding of the balancing chamber at a limited rate when balancing chamber pressure predominates; sealing means adapted to be engaged by said piston at its limit of motion toward the balancing chamber; a yielding stop for resisting motion of the piston into engagement with said sealing means; a pair of poppet valves, one a pilot valve controlling a port through the other, and the two valves conjointly controlling venting flow from the brake pipe chamber; and means for establishing thrust engagement between said piston and said valves whereby first the pilot valve and then the other valve are unseated serially when the piston moves under predominant balancing chamber pressure.

8. A vent valve comprising in combination a chamber adapted for connection with a brake pipe; a balancing chamber; a movable piston interposed between said chambers; throttling means actuated by motion of the piston and controlling charging of the balancing chamber from the brake pipe chamber when brake pipe pressure predominates, and the bleeding of the balancing chamber at a limited rate when balancing chamber pressure predominates; sealing means adapted to be engaged by said piston at its limit of motion toward the balancing chamber; a yielding stop for resisting motion of the piston into engagement with said sealing means; a pair of poppet valves, one a pilot valve controlling a port through the other, and the two valves conjointly controlling venting flow from the brake pipe chamber; and means for establishing thrust engagement between said piston and said valves whereby first the pilot valve and then the other valve are unseated serially when the piston moves under predominant balancing chamber pressure, said last-named means being so arranged that said piston moves clear of said yielding stop before engaging and opening the pilot valve.

9. A vent valve comprising in combination a chamber adapted for connection with a brake pipe; a balancing chamber mounted beneath the same; a movable abutment interposed between said chambers; throttling means controlled by said abutment for controlling the charging of the balancing chamber from the brake pipe when brake pipe pressure predominates, and the bleeding of the balancing chamber at a limited rate when balancing chamber pressure predominates; a poppet valve and seat mounted in the brake pipe chamber above the bottom thereof; an actuating connection between said piston and said poppet valve; and means forming a water collecting pocket in the brake pipe chamber and serving to protect said poppet valve and said actuating means from contact with collected foreign substances.

10. In a vent valve the combination of a chamber adapted for connection with a brake pipe; a balancing chamber; a movable abutment interposed between said chambers; throttling means controlling the charging of the balancing chamber from the brake pipe chamber, and the bleeding of the balancing chamber at a limited rate; a pair of poppet valves, one a pilot valve controlling a port through the other or main valve, the two valves conjointly controlling venting flow from the brake pipe chamber; a spring acting directly against one of said valves, and serving to urge both in a sealing direction; and thrust means reacting between said piston and valves whereby the piston will unseat first the pilot valve and then the other valve serially when the piston moves under predominant balancing chamber pressure.

11. The combination of claim 10 further characterized in that both of said valves are provided with sealing gaskets, and that the main valve is provided with a tubular nut which extends through the valve, serves to retain its sealing gasket and terminates in a bead serving as a seat for the sealing gasket of the pilot valve.

12. The combination of claim 10 in which the thrust means comprises shouldered rods having portions which extend through apertures in the two valves, the shoulders on the rods having a spacing greater than the spacing of the engaged portions of the two valves when the valves are closed.

13. The combination of claim 10 in which the thrust means comprises shouldered rods having portions which extend through apertures in the two valves, and in which the rods serve to center and guide said valves.

14. In a vent valve the combination of a chamber adapted for connection with a brake pipe; a balancing chamber; a movable abutment interposed between said chambers; throttling means controlling the charging of the balancing chamber from the brake pipe chamber, and the bleeding of the balancing chamber at a limited rate; a pair of poppet valves, one a pilot valve controlling a port through the other or main valve, the two valves conjointly controlling venting flow from the brake pipe chamber, one of said valves having upstanding lugs; a pair of springs, one acting directly against one of said valves, and the other acting against said guiding lugs of the other valve; and thrust means reacting between said piston and valves whereby the piston will unseat first the pilot valve and then the other valve serially when the piston moves under predominant balancing chamber pressure.

15. A vent valve comprising in combination a chamber adapted for connection with a brake pipe; a balancing chamber; a movable abutment interposed between said chambers; throttling means controlling the charging of the balancing chamber from the brake pipe chamber and the bleeding of the balancing chamber at a limited rate; a pair of poppet valves, one a pilot valve controlling a port through the other, and the two valves opening in the same direction and conjointly controlling venting flow from the brake pipe chamber; connections between the abutment and said valves for unseating first the pilot and then the other valve serially by motion of the abutment, and a spring urging the pilot valve in a closing direction.

16. In a vent valve, the combination of a housing member having a chamber adapted for connection with a brake pipe, a vent passage leading from said chamber, and a valve seat controlling said vent passage; a second housing member having a balancing chamber, and adapted to enter into direct positioning contact with the first housing; a removable cylinder bushing mounted in direct positioning contact with at least one of said housings; gasket means for sealing the joints between said housings, and between said housings and bushing; a piston working in said bushing and interposed between said chambers; throttling means controlled by motion of said piston for regulating flow back and forth between said chambers; a poppet valve on said seat; means for establishing thrust engagement between said piston and valve; and a guide for said piston carried by said removable bushing.

17. In a vent valve, the combination of a housing member having a chamber adapted for connection with a brake pipe, a vent passage leading from said chamber, and a valve seat controlling said vent passage; a second housing member having a balancing chamber, and adapted to enter into direct positioning contact with the first housing; a removable cylinder bushing mounted in direct positioning contact with at least one of said housings; gasket means for sealing the joints between said housings, and between said housings and bushing; a piston working in said bushing and interposed between said chambers; throttling means controlled by motion of said piston for regulating flow back and forth between said chambers; a poppet valve on said seat; means for establishing thrust engagement between said piston and valve; a seating rim for said piston formed on said bushing; a guide for said piston carried by said bushing; and a yielding stop carried by said bushing and serving normally to hold said piston clear of said seating rim.

18. The structure of claim 16, further characterized in that said throttling means is controlled by coaction between a port in said piston and said guide.

19. A vent valve comprising in combination a brake pipe chamber adapted for connection with a brake pipe; a balancing chamber; a movable abutment interposed between said chambers; throttling means controlling the charging of the balancing chamber from the brake pipe chamber when brake pipe pressure predominates and the bleeding of the balancing chamber when balancing chamber pressure predominates; a valve controlling venting flow from the brake pipe chamber to a vent port; an operative connection between said valve and abutment; a member shiftable between two positions, in one of which it seals and in the other of which it frees said vent port; yielding means urging said shiftable member to the second of said positions; and clamping means for locking said member in the first of said positions.

20. A vent valve comprising in combination a brake pipe chamber; a balancing chamber; a movable abutment interposed between said chambers; throttling means controlling the charging of the balancing chamber from the brake pipe chamber when brake pipe pressure predominates, and the bleeding of the balancing chamber when balancing chamber pressure predominates; a brake pipe vent valve controlling flow from the brake pipe chamber; an operative connection between said abutment and said vent valve for opening the vent valve; and means for venting said balancing chamber when said vent valve is fully open.

21. A vent valve comprising in combination a brake pipe chamber; a balancing chamber; a movable abutment interposed between said chambers; throttling means controlling the charging of the balancing chamber from the brake pipe chamber when brake pipe pressure predominates, and the bleeding of the balancing chamber when balancing chamber pressure predominates; a brake pipe vent valve controlling flow from the brake pipe chamber; an operative connection between said abutment and said vent valve for opening the vent valve; and a vent port leading from said balancing chamber, controlled by said abutment, and opened thereby when the abutment is in position to hold said vent valve open.

22. A vent valve, comprising in combination a housing enclosing a chamber adapted for connection with a brake pipe; a housing enclosing a balancing chamber, said housings being in direct positioning engagement with each other; a compressible gasket sealing the joint between said housings; a movable piston interposed between said chambers; throttling means actuated by motion of the piston and controlling charging of the balancing chamber from the brake pipe chamber when brake pipe pressure predominates and the bleeding of the balancing chamber at a limited rate when balancing chamber pressure predominates; sealing means adapted to be engaged by said piston at its limit of motion toward the balancing chamber; a yielding stop for resisting motion of the piston into engagement with said sealing means, said stop, when in its normal position, being definitely located relatively to said chamber housing; a poppet valve and seat therefor controlling venting flow from the brake pipe chamber, said seat being definitely positioned relatively to said brake pipe housing; and means establishing thrust engagement between said piston and said poppet valve, said last named means offering lost motion to the piston whereby it clears said yielding stop before it engages said poppet valve.

CHARLES A. CAMPBELL.